United States Patent [19]
Liao

[11] Patent Number: 5,596,914
[45] Date of Patent: Jan. 28, 1997

[54] FOIL CUTTING DEVICE

[76] Inventor: Benker P. C. Liao, 5th Fl., No. 278, Sec. 4, Chungsiao E. Rd., Taipei, Taiwan

[21] Appl. No.: 573,558

[22] Filed: Dec. 15, 1995

[51] Int. Cl.$^6$ .................................................. B23B 7/00
[52] U.S. Cl. .................... 82/70.2; 82/59; 53/442
[58] Field of Search ........................ 82/59, 70.1, 70.2, 82/100, 101; 83/628, 602, 582, 591, 596, 563; 53/557, 389.3, 442

[56] References Cited

U.S. PATENT DOCUMENTS

| | | | |
|---|---|---|---|
| 2,662,597 | 12/1953 | Ballard et al. | 83/602 |
| 2,724,939 | 11/1955 | Vogt | 53/389.3 |
| 3,522,747 | 11/1955 | Brownstein | 82/101 X |
| 3,621,637 | 11/1971 | Sternau | 53/557 |
| 4,213,357 | 7/1980 | Lively et al. | 82/70.2 X |
| 4,682,919 | 7/1987 | Mitchell | 82/70.2 X |
| 5,056,388 | 10/1991 | Dekker et al. | 82/59 |
| 5,237,800 | 8/1993 | Omori | 53/442 X |
| 5,448,873 | 9/1995 | Jennings et al. | 53/389.3 X |

Primary Examiner—M. Rachuba
Assistant Examiner—Henry W. H. Tsai
Attorney, Agent, or Firm—Schmeiser, Olsen & Watts

[57] ABSTRACT

A foil cutting device is disclosed to be used in a packing machine for applying a heat-shrinkable plastic capsule and/or a heat-shrinkable plasti-shield and/or a heat-shrinkable plastic wrap onto a package. The cutting device comprises a rotatable disk defining a hollow portion, a die barrel extending through the hollow portion of the disk and defining a gap with the disk for a foil to be cut to extend therethrough, a cutting unit fixedly mounted on the disk, a manipulating unit pivotably mounted on the disk to control the operation of the cutting unit, a first cam unit used to act on the cutting unit and a second cam unit used to act on the manipulating unit.

11 Claims, 7 Drawing Sheets

FOIL CUTTING DEVICE

FIELD OF THE INVENTION

The present invention is related to a foil cutting device, particularly to a heat-shrinkable plastic foil cutting device. Such a device is particularly used in a packing machine for applying a heat-shrinkable plastic capsule and/or a heat-shrinkable plasti-shield and/or a heat-shrinkable plastic wrap onto a package, for example, a bottle, can, box, etc., wherein the capsule and/or plastic-shield and/or wrap may be used as a means for protecting the package and the goods contained in the package.

BACKGROUND OF THE INVENTION

A conventional packing machine for applying a heat-shrinkable capsule and/or a heat-shrinkable plasti-shield and/or a heat-shrinkable plastic wrap onto a package generally has a cutting device for cutting a roll of foil into sheets. The foil is extended via a series of rollers and a gripping mechanism onto a die wherein the foil is adjacent to a supportive surface thereof. Then, the cutting device is operated to cut the foil to obtain a sheet with a predetermined length. Thereafter, the cut heat-shrinkable plastic sheet is transferred and, for example, wrapped around a package (for example, a folded paper box for a bar of soap) by means of an arrangement of specifically designed jigs. Finally, the soap box, which has been loaded with a bar of soap therein, is subjected to heat to shrink the plastic sheet so that it may be very be tightly fastened onto the box to form a protective film for the paper soap box.

Conventionally, the cutting device for the above-mentioned packing machine has a linear movement for its cutting tool. This means that when the heat shrinkable plastic foil is extended onto the die and located adjacent to the supportive surface, which can be monitored by electrical-optical sensors, the cutting tool of the cutting device is linearly extended to cut the foil to obtain a sheet, and, then, linearly retracted to its original position to await the next cutting operation.

Such a conventional cutting device has a low cutting efficiency, which causes the subsequent operating steps of the packing machine to be deferred to a certain extent; thus, the operating efficiency of the packing machine can not be promoted.

The present invention is disclosed to afford an improved foil cutting device which can mitigate and/or obviate the above-mentioned problem concerning the conventional foil cutting device.

SUMMARY OF THE INVENTION

It is an objective of the present invention to provide a foil cutting device which has a very high cutting efficiency..

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
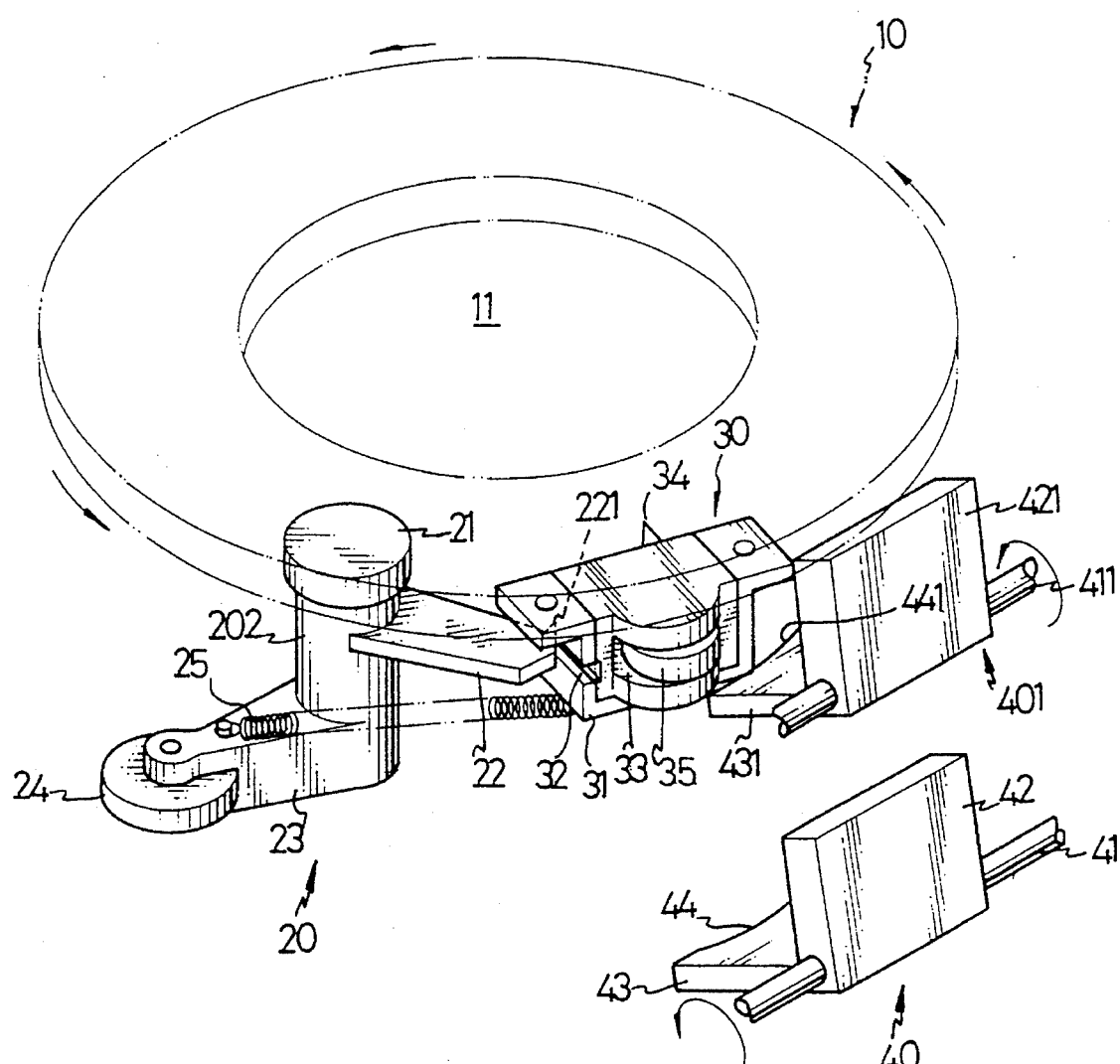
FIG. 1 is a rear, right, top perspective view of a foil cutting device in accordance with the present invention.

Referring to FIG. 1, the present foil cutting device is generally composed of a rotatory disk 10 (indicated by phantom lines) defining a central circular hollow portion 11, a manipulating unit 20, a cutting unit 30 and a first and second cam units 401, 40. The disk 10 can be driven to rotate in a direction as shown by the arrows beside the disk 10 by a known means ( for example, a motor and a transmission mechanism). A die barrel 12 (referring to FIG. 6) is positioned in the hollowed portion 11. The die barrel 12 is used for supporting a heat-shrinkable plastic foil 50 (FIG. 6) when the foil 50 is extended through the present device and intended to be cut by the cutting unit 30. The die barrel 12 and the disk 10 define a gap therebetween for receiving the foil 50 extending therethrough.

Figure 2:
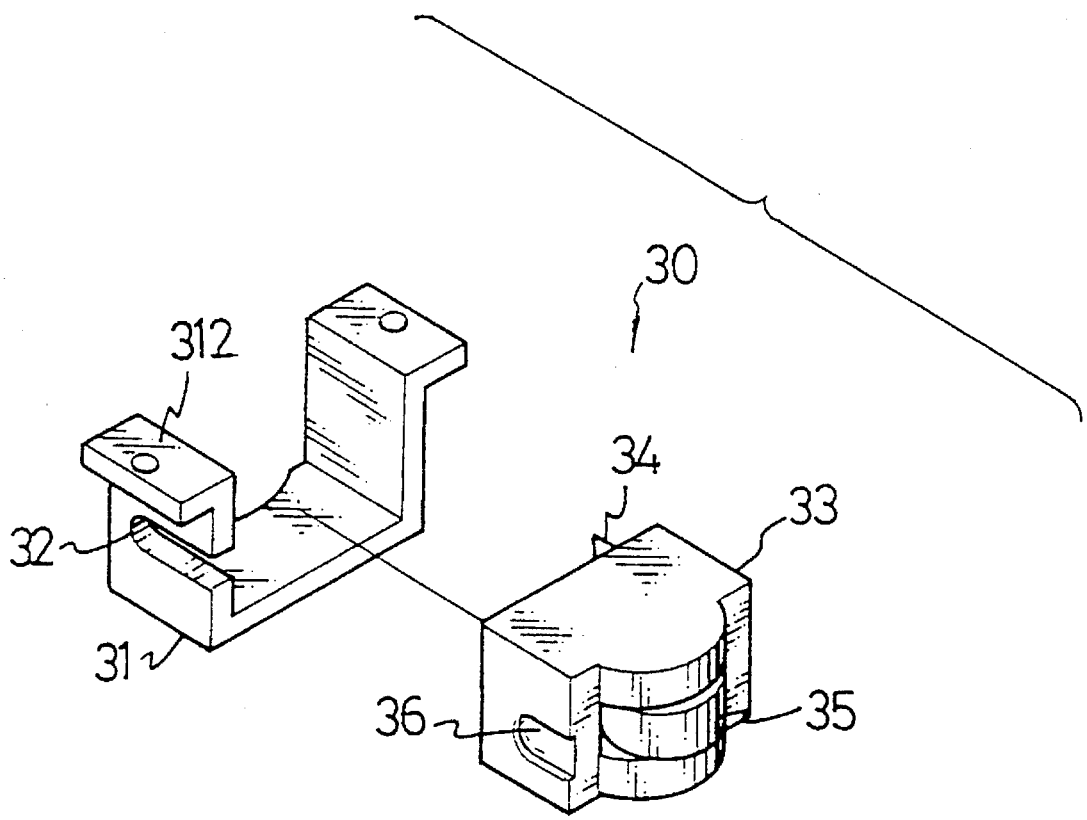
FIG. 2 is a rear, right, top perspective, exploded view of a cutting unit of the foil cutting device as shown in FIG. 1.

Now also refer to FIG. 2. The cutting unit 30 is mounted on an underside of the disk 10. The cutting unit 30 is composed of a generally U-shaped base 31, and a cutting tool mounting block 33 which is slideably mounted on the base 31. The base 31 is fixedly mounted on the disk 10 by its two laterally extending portions 312 being fixedly attached thereto by a known means, for example, riveting. A cutting tool 34 is fixedly attached on a front side of the mounting block 33. Furthermore, the mounting block 33 is provided a roller 35 on a rear side thereof, and defines a recess 36 on a rear portion of a right side thereof. The roller 35 is rotatably fixed on the block 33. A slot 32 is defined in a right-side wall of the base 31, wherein the slot 32 has a length longer than that of the recess 36. When the roller 35 is subjected to a pushing force, it will cause the block 33 to move forwardly to cause the cutting tool 34 to protrude from the disk 10 defining the hollow portion 11 (better seen in FIG. 4). Also referring to FIG. 4, two pins 60 are provided on an edge of the disk 10 defining the hollow portion 11 to function as a stop to limit the travel of the block 33 toward a center of disk 10.

Figure 7:
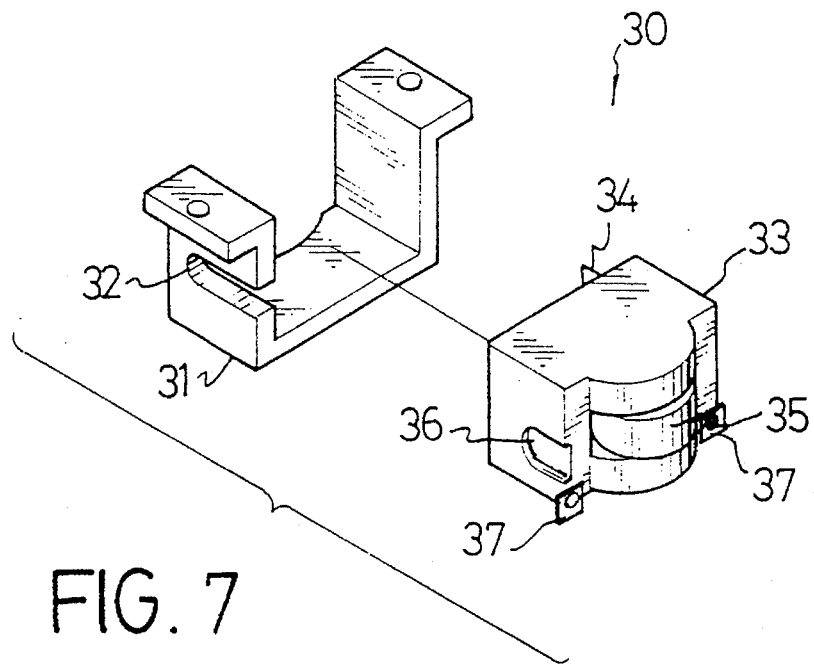
FIG. 7 is a view similar to FIG. 2 but showing a second preferred embodiment of the cutting unit.

FIG. 7 shows a further possible embodiment of the block 33 wherein two plates 37 are fixedly attached on two respective rear, bottom corners thereof and laterally extended to protrude a distance from a corresponding side face of the mounting block 33. In this embodiment, the plates 37 can replace the function of the pins 60 to limit the forward travel of the block 33. (Note: The plates 37 will be blocked by side walls of the base 31 when the mounting block 33 is pushed forwardly.) Thus, in the embodiment, the pins 60 are no longer needed.

When the mounting block 33 is mounted on the base 31, the recess 36 is aligned with the slot 32.

Figure 3:
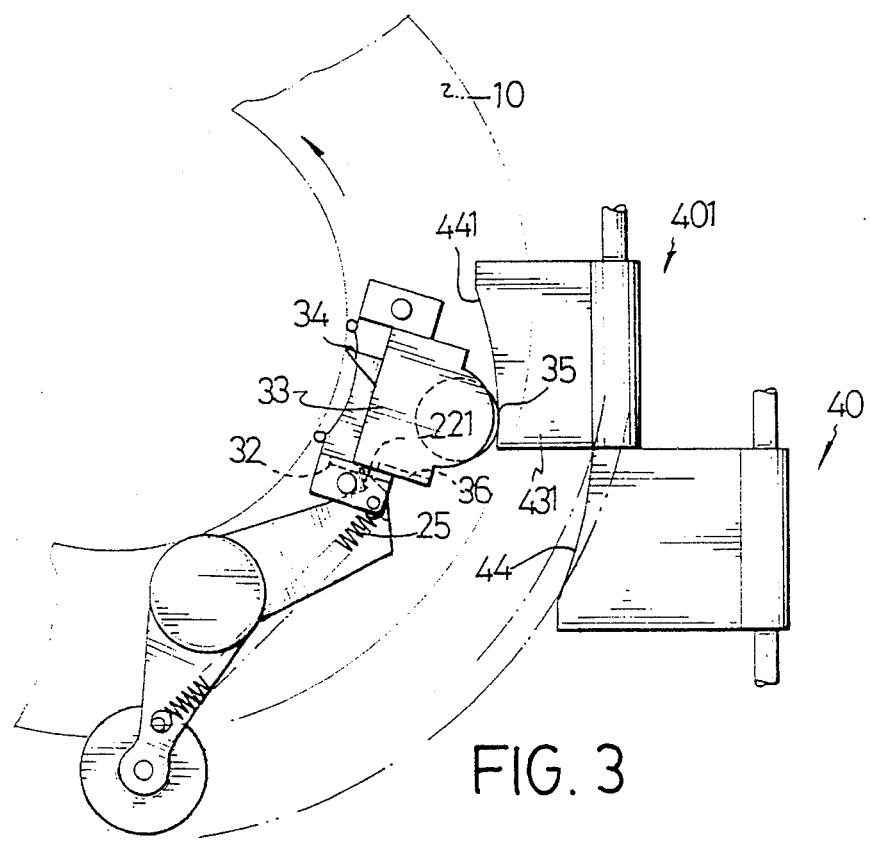
FIG. 3 is a top view as viewed from the right side of FIG. 1, partly removed away, showing that the present cutting device is under a first operating step.
Figure 6:
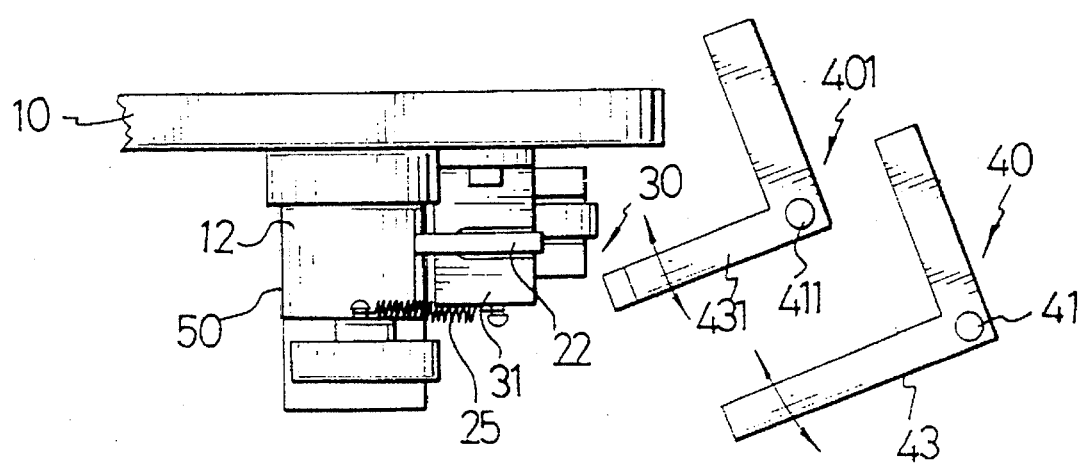
FIG. 6 is a right side view of FIG. 1 with a part thereof being removed away.

Now please refer to FIGS. 1, 3 and 6. The manipulating unit 20 is composed of a head 21 rotatably connected to the disk 10, a stem 202 integrally formed with the head 21 and extending downwardly therefrom, an arm 22 extending from the stem 202 and toward the cutting unit 30 and a leg 23 extending from the stem 202 and away from the cutting unit 30. A hook 221 is defined on an end of the arm 22 distal from the stem 202. Preferably, the arm 22 and the leg 23 form an angle of 136° therebetween. A roller 24 is rotatably fixed on an end of the leg 23 distal from the stem 202. A tension spring 25 has an end fixedly connected to the leg 23 and another end fixedly connected to an underside of the base 31. The spring 25 exerts a pulling force on the leg 23, which causes the manipulating unit 20 to always have an intention to rotate counterclockwise as viewed from FIG. 3. The intention of a counterclockwise rotation of the manipulating unit 20 causes the hook 221 to run into the slot 32 of the base 31 and rest against a front portion of the right side of the block 33 when the cutting unit 30 is not operated to cut the foil (better seen in FIG. 3).

Also referring to FIGS. 1, 3 and 6, the first and second cam units 401, 40 have substantially the same structure. The first cam unit 401 is arranged to be closer to the disk 10 than the second cam unit 40 and located above and at a left side of the second cam unit 40. The second cam unit 40 is composed of a generally L-shaped plate 43 and a shaft 41 fixedly connected with the L-shaped plate 43. The first cam unit 401 is composed of a generally L-shaped plate 431 and a shaft 411 fixedly connected with the L-shaped plate 431. Each of the shafts 41, 411 can be driven by a corresponding control mechanism (not shown) to have a pivotable movement at a required moment, as indicated by each of the arrows neighboring the shafts 41, 411 in FIG. 1, whereby the L-shaped plates 43, 431 can also have a pivotable movement, accordingly. Such a control mechanism is known by those skilled in the art and may consist of, for example, an electronic circuit and a motor. The horizontal portion of the L-shaped plate 431 has a first cam surface 441 at a front edge thereof. Also, the horizontal portion of the L-shaped plate 43 has a second cam surface 44 at a front edge thereof.

When the L-shaped plates 43, 431 are pivoted so that their respective horizontal portions are parallel to the disk 10, the second cam surface 44 will contact with the roller 24 and the first cam surface 441 will contact with the roller 35, when the rollers 35 and 24 are carried by the disk 10 to rotate about a rotating axis of the disk 10 (FIGS. 4 and 5) and pass through the first and second cam units, 401, 40, respectively.

Alternatively, referring to FIG. 6, when the shafts 41 and 411 are pivoted so that the horizontal portions of the L-shaped plates 43, 431 are pivoted downwardly from the above-mentioned position where they are parallel to the disk 10, the contact between the cam surfaces 44, 441 and the rollers 24, 35 will not happen.

When operation of the present invention begins, the cutting tool mounting block 33 is brought to its rear-most position as shown in FIG. 3, in which a cutting edge of the cutting tool 34 is located behind the edge of the disk 10 defining the hollow portion 11 so that the cutting tool 34 will not perform a cutting action on the foil 50 between the disk 10 and the die barrel 12 located in the hollow portion 11 of the disk 10. The cam units 40, 401 are pivoted by the control mechanism to the position as shown in FIG. 6, in which the cam surfaces 44, 441 will not contact with the rollers 24, 35 or any part of the of the cutting unit 30 or the manipulating unit 20.

Then, the disk 10 is driven to start to rotate. During the initial rotation of the disk 10, due to a centrifugal force acting on the block 33 and the resting force of the hook 221 on the front portion of the right side of the block 33, the position of the block 33 can be kept unchanged (i.e., on its rear-most position).

Figure 4:
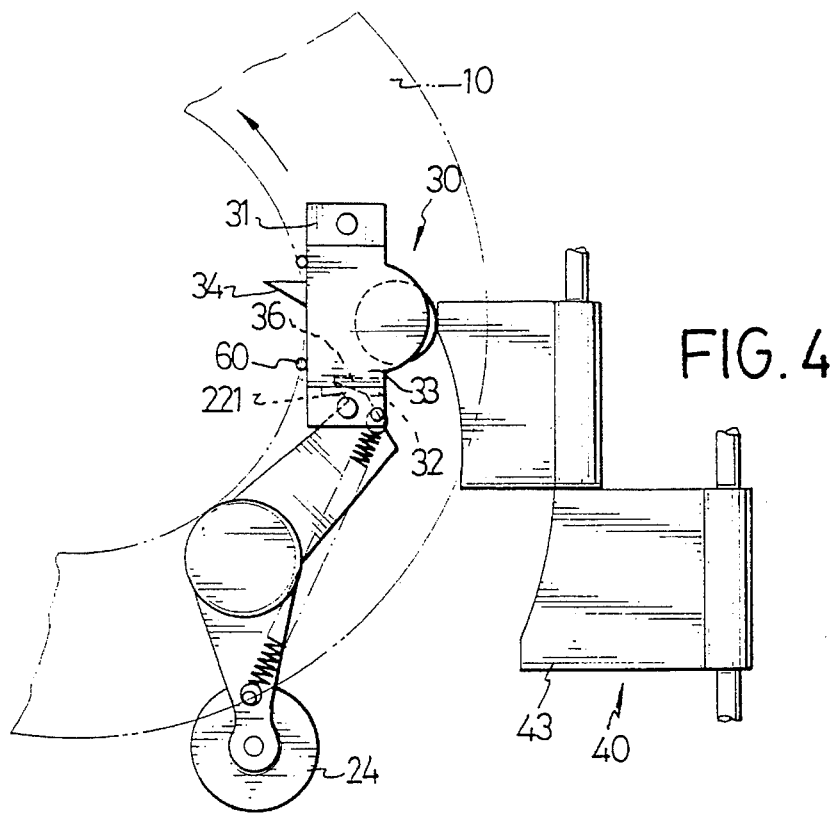
FIG. 4 is a view similar to FIG. 3 but showing that the present cutting device is under a second operating step.

When the speed of rotation of the disk 10 reaches a required speed and is maintained at that speed, the present cutting device will begin to perform the cutting action by the following manner. Firstly, the control mechanism for the first cam unit 401 is operated to pivot the shaft 411 until the horizontal portion of the L-shaped plate 431 is parallel to the disk 10, in which when the cutting unit 30 is rotated to pass through the first cam unit 401, the roller 35 thereof will contact with and then be pushed by the first cam surface 441 (FIG. 3) until the mounting block 33 is moved to its front-most position as shown in FIG. 4, in which the cutting tool 34 is fully extended into the hollow portion 11 to begin the cutting action. The first cam surface 441 is so configured that it gradually pushes the mounting block 33 toward the hollow portion 11 when the mounting block 33 is rotated with the disk 10 to contact with the first cam surface 441.

Once the mounting block 33 is moved to the position as shown in FIG. 4, in which the roller 35 is contacted with a highest point of the first cam surface 441, the recess 36 defined in the rear portion of the right side of the mounting block 33 is moved forwardly to a position in which the front end portion of the recess 36 is aligned with the hook 221 so that the manipulating unit 20 is further rotated counterclockwise (via the action of the spring 25) to cause the hook 221 to run into the recess 36 and engage a front end of a periphery defining the recess 36. Thus, the mounting block 33 can be maintained on its front-most portion even when the roller 35 is no longer in contact with the first cam surface 441.

When the cutting tool 34 reaches the position as shown in FIG. 4, it starts to cut the foil 50 until the roller 24 has contacted with the second cam surface 44, which will be more detailedly discussed later.

Once the roller 35 leaves its contact with the first cam unit 401, the first cam unit 401 will return to its inclined position as shown in FIG. 6, and the second cam unit 40 will be pivoted by a rotation of its shaft 41 to reach a position where the horizontal portion of the L-shaped plate 43 is parallel to the disk 10.

Figure 5:
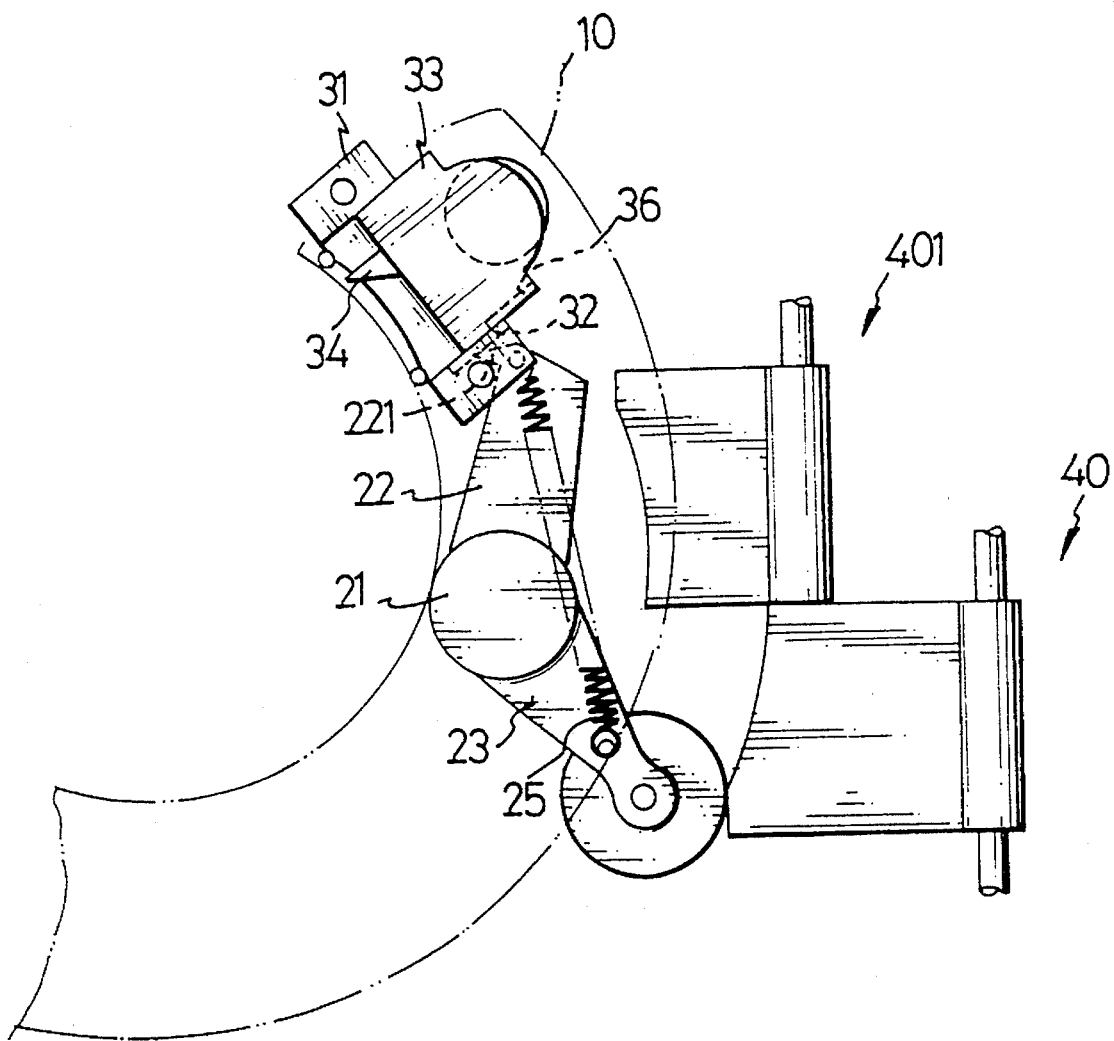
FIG. 5 is a view similar to FIG. 3 but showing that the present cutting device is under a third operating step.

Referring to FIG. 5, when the roller 24 approaches the second cam unit 40, the roller 24 will first contact a highest point of the second cam surface 44, which causes a clockwise rotation of the manipulating unit 20 to release the engagement between the hook 221 and the front end of the recess 36. Meanwhile, due to the centrifugal force generated by the rotation of the disk acting on the mounting block 33, the mounting block 33 will move backwardly to reach the position as shown by FIG. 5, wherein the cutting tool 34 is retracted into the disk 10. Thereafter, the roller 25 will move following the track defined by the second cam surface 44 until the roller 25 leaves its contact with the second cam unit 40 in which the manipulating unit 20 will return to its original position relative to the cutting unit 30 as shown in FIG. 3. Once the roller 24 leaves its contact with the second cam surface 44, the second cam unit 40 is pivoted to return to its original position as shown by FIG. 6. The second cam surface 44 is so configured that once the roller 24 contacts the second cam surface 44, the engagement between the periphery defining the front end of the recess 36 of the mounting block 33 and the hook 221 is released, and, then, the hook 221 is gradually moved toward the mounting block 33.

Since the cutting tool 34 is maintained at its fully extended position into the hollow portion 11 during the rotation of the disk 10 between the positions that the roller 35 contacts with the highest point of the first cam surface 441 and the roller 24 contacts with the highest point of the second cam surface 441, the cutting tool 34 can perform a cutting action on the heat-shrinkable plastic foil 50 during this period to obtain a sheet therefrom. Thereafter, a subsequent cutting operation is started when the roller 35 is rotated by the rotation of the disk 10 to contact with the first cam surface 441 again, from which another cutting cycle as shown from FIGS. 3 to 5 is repeated to obtain another sheet from the foil 50, wherein, certainly, before the roller 35 contacts with the first cam surface 441, the foil 50 has already been drawn downwardly the required length for the sheet.

Figure 8:
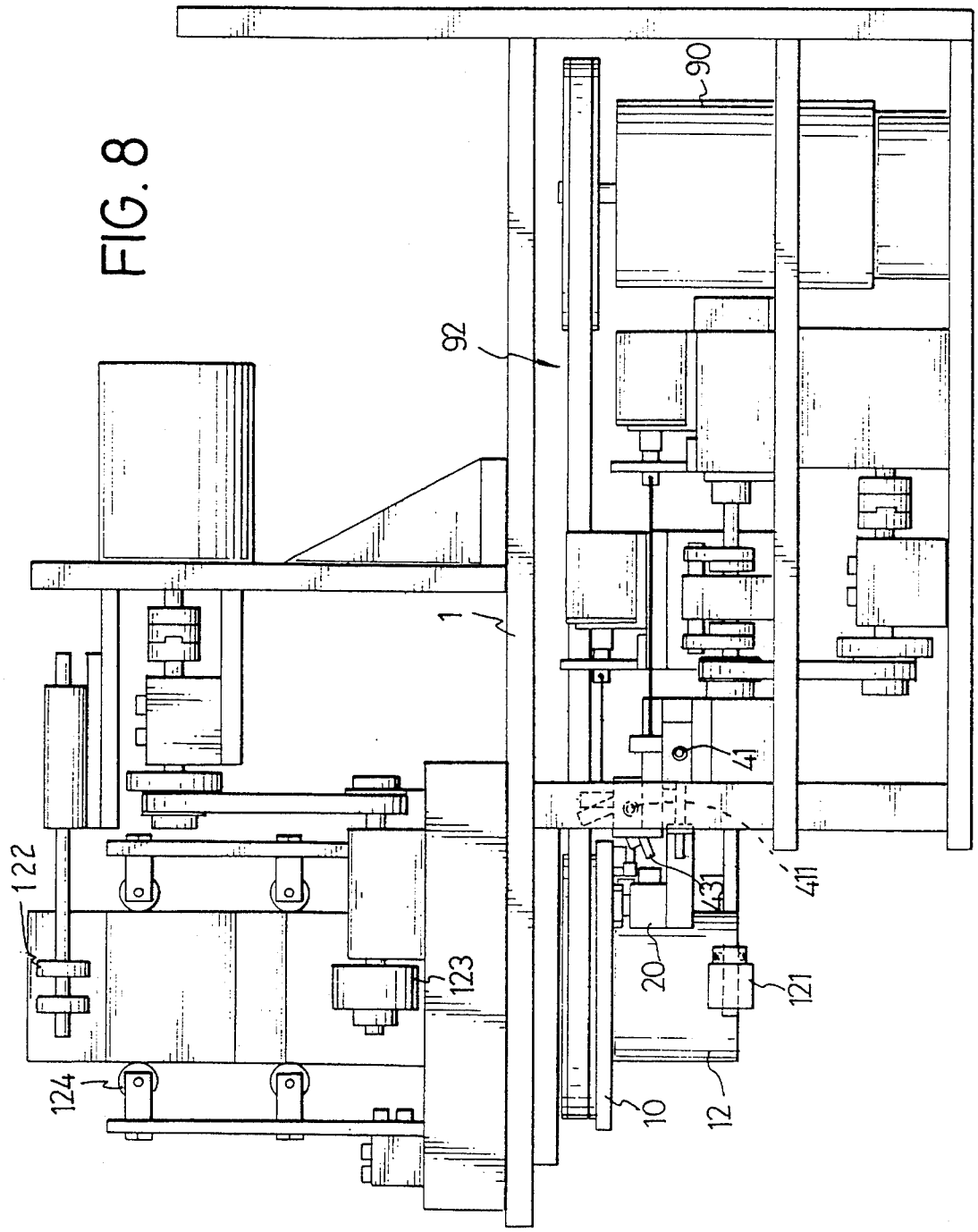
FIG. 8 is a diagrammatic view showing the situation that the present cutting device is mounted on a packing machine for applying a heat-shrinkable capsule and/or a heat-shrinkable plasti-shield and/or a heat-shrinkable plastic wrap onto a package.
Figure 9:
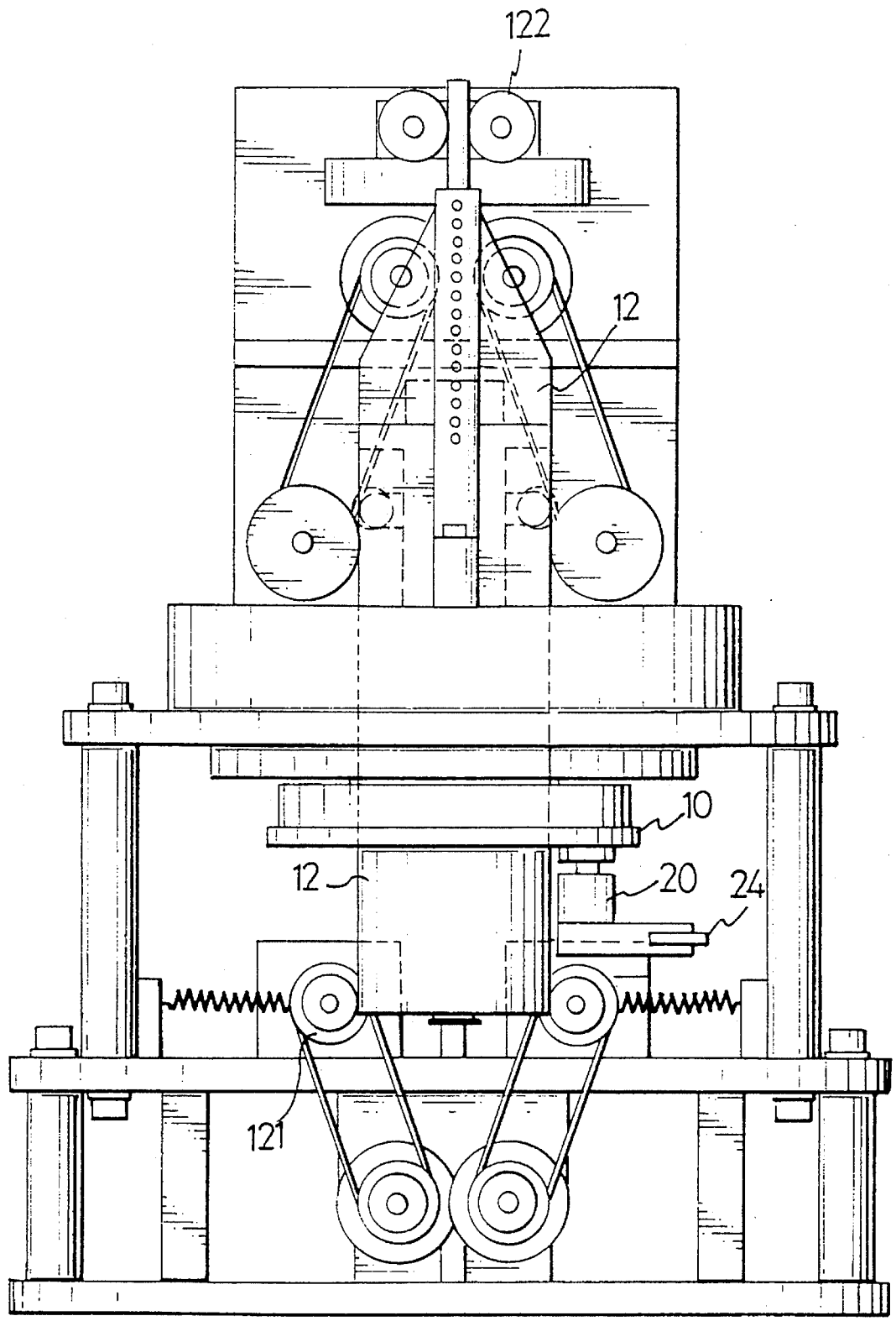
FIG. 9 is a diagrammatic view generally viewed from a left side of FIG. 8, wherein the scale of FIG. 9 is not proportional to FIG. 8.

Now refer to FIGS. 1, 8 and 9, wherein FIGS. 8 and 9 show the situation that the present foil cutting device is incorporated in a machine for applying a heat-shrinkable plastic capsule and/or a heat-shrinkable plasti-shield and/or a heat-shrinkable plastic wrap onto a package. The disk 10 is rotatably mounted on a frame 1 of the machine. The disk 10 is driven by a motor 90 through a transmission mechanism, for example, a belt pulley 92, to rotate about its axis. The cutting unit 30 and manipulating unit 20 are mounted on an underside of the disk 10. The first and second cam units 401, 40 are pivotably mounted on the machine by their shafts 411, 41 being respectively pivotably mounted on suitable positions of the frame 1. The die barrel 12 is vertically extended through the disk 10. A transfer device 121 is provided at a bottom of the die barrel 12 which is used to transfer the cut sheet from the die barrel 12 onto a package located below the die barrel 12. Furthermore, the top portion of the die barrel 12 is formed to have a triangular profile. Two upper idle rollers 122 are provided on a side of the triangular-profiled top portion to guide the entrance of the foil 50 onto the die barrel 12. Further idle rollers 124 are provided on a middle portion of the die barrel 12 to guide a movement of the foil 50 along the die barrel 12. A drawing device 123 is provided near the disk 10 which is used to exert a downward drawing force on the foil 50 to cause the foil 50 to move downwardly each time a required length so that the present cutting device can cut a sheet having a required length from the foil 50 for each operating cycle of cutting.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A foil cutting device, comprising:

a rotatable disk defining a hollow portion;

a die barrel extending through the hollow portion of the disk and defining a gap with the disk, said gap being adapted to allow a foil to be cut to extend therethrough;

a cutting unit having a base fixedly mounted on the disk, a cutting tool mounting block slideably mounted on the base, and a cutting tool fixedly attached on the mounting block and extending toward the hollow portion of the disk;

a manipulating unit pivotably mounted on the disk, having an arm with a hooked end extending toward the cutting unit, a leg extending in a direction substantially away from the cutting unit, and a force generating means continually exerting a force to cause the arm to extend into the cutting unit;

a first cam means defining a first cam surface whereby when the mounting block is rotated with the disk to contact with the first cam surface, the mounting block with the cutting tool will move toward the hollow portion until the cutting tool reaches a fully extended position in which the hooked end of the arm of the manipulating unit is engaged with the mounting block to lock the mounting block in place; and a second cam means defining a second cam surface whereby when the leg of the manipulating unit is rotated with the disk to contact with the second cam surface, the engagement between the hooked end of the arm and the mounting block is released.

2. A foil cutting device in accordance with claim 1, wherein the force generating means is a tension spring having an end fixedly connected with the leg of the manipulating unit and another end fixedly connected with the base of the cutting unit.

3. A foil cutting device in accordance with claim 1, wherein the engagement between the hooked end of the arm and the mounting block is achieved by the hooked end engaging a front end of a recess defined on the mounting block.

4. A foil cutting device in accordance with claim 1, wherein the arm and the leg of the manipulating unit form an angle of about 136° therebetween.

5. A foil cutting device in accordance with claim 1, wherein the first cam means comprises a first L-shape plate having a first horizontal portion defining the first cam surface, and a first shaft fixedly connected with the first L-shaped plate, said first shaft being adapted to receive an outside driving force to cause a pivoting movement of the first L-shaped plate thereby to control the contact of the first cam surface and the mounting block of the cutting unit.

6. A foil cutting device in accordance with claim 1, wherein the second cam means comprises a second L-shape plate having a second horizontal portion defining the second cam surface, and a second shaft fixed connected with the second L-shaped plate, said second shaft being adapted to receive an outside driving force to cause a pivoting movement of the second L-shaped plate thereby to control the contact of the second cam surface and the leg of the manipulating unit.

7. A foil cutting device in accordance with claim 5, wherein the first cam surface is so configured that it gradually pushes the mounting block toward the hollow portion of the disk when the mounting block is rotated with the disk to contact with the first cam surface.

8. A foil cutting device in accordance with claim 6, wherein the second cam surface is so configured that once the leg contacts the second cam surface the engagement between the mounting block and the hooked end of the arm is released, and, then, the hooked end of the arm is gradually moved toward the mounting block.

9. A foil cutting device in accordance with claim 1, wherein the first cam means is arranged to be closer to the disk than the second cam means.

10. A foil cutting device in accordance with claim 1, wherein the cutting unit, the manipulating unit, and first and second cam means are all positioned below the disk.

11. A foil cutting device in accordance with claim 1, wherein the device is used in a packing machine for applying a heat-shrinkable plastic capsule a heat-shrinkable plasti-shield a heat-shrinkable plastic wrap onto a package.

* * * * *